United States Patent [19]

Klingler et al.

[11] Patent Number: 4,896,443
[45] Date of Patent: Jan. 30, 1990

[54] DITCH FORMING APPARATUS

[76] Inventors: Paul Klingler; Kenneth Klingler; David Klingler, all of Rte. 2, Noble, Ill. 62868

[21] Appl. No.: 298,908

[22] Filed: Jan. 19, 1989

[51] Int. Cl.$^4$ .................. A01B 13/02; E02F 5/02
[52] U.S. Cl. ...................... 37/98; 172/439; 172/574
[58] Field of Search ............ 172/574, 575, 187, 184, 172/744, 603, 534, 483, 762, 484, 763, 510, 185, 186, 774, 180, 181, 151, 166, 606; 37/98; 111/81, 86, 87, 88

[56] References Cited

U.S. PATENT DOCUMENTS

| | | | |
|---|---|---|---|
| 588,787 | 8/1897 | Aktins | 172/575 |
| 642,273 | 1/1900 | White | 172/575 |
| 710,303 | 9/1902 | Rentsch | 172/574 |
| 736,963 | 8/1903 | Ham | 172/187 |
| 1,758,132 | 5/1930 | Stockton | 172/575 |
| 2,486,442 | 11/1949 | Silver | 172/186 |
| 2,582,538 | 1/1952 | Flynn | 37/98 |
| 2,659,291 | 11/1953 | Tanke | 172/603 |
| 2,734,439 | 2/1956 | Padrick | 172/184 |
| 3,718,191 | 2/1973 | Williams | 172/196 |
| 4,279,311 | 7/1981 | Dietrich, Sr. | 172/596 |
| 4,295,532 | 10/1981 | Williams et al. | 172/184 |
| 4,425,973 | 1/1984 | Williams | 172/574 |
| 4,431,061 | 2/1984 | White | 172/483 |
| 4,483,401 | 11/1984 | Robertson | 172/574 |
| 4,779,684 | 10/1984 | Schultz | 172/575 |

OTHER PUBLICATIONS

Brochure entitled "Glencoe Welcomes the Power Ditchers," from Portable Elevator Division, Dynamics Corporation of America, Bloomington, Ill. 61702, believed to have been published in Oct. 1986.

Primary Examiner—Richard J. Johnson
Attorney, Agent, or Firm—Emrich & Dithmar

[57] ABSTRACT

A ditch forming apparatus includes a pair of discs rotationally mounted in a back-to-back arrangement to a support frame with their respective convex surfaces in facing relation and their concave surfaces directed outwardly. The discs are oriented in an angled manner relative to the direction of displacement of the support frame such that the leading edges of the discs overlap along the displacement direction, with one disc positioned aft of and lower, or deeper in the soil, than the other disc to compensate for the increased drag imposed on the forward disc in providing straight tracking for the apparatus through the soil. Drag compensation may also be provided by orienting the aft disc at a greater angle relative to the direction of displacement of the apparatus than the forward disc. The ditch forming apparatus is adapted for coupling to and being drawn by a traction vehicle and is adjustable for controlling the depth and width of the ditch, has a minimum number of moving parts, and distributes the soil evenly to both sides of the ditch.

22 Claims, 1 Drawing Sheet

DITCH FORMING APPARATUS

BACKGROUND OF THE INVENTION

This invention relates generally to a soil engaging and working apparatus and is particularly directed to apparatus for forming a ditch.

Water control is important in various environments such as building construction and agriculture. In the former, incorporation of suitable drainage ditches in landscape layout provides protection against flooding, while in the latter environment it is frequently necessary to drain excess water from wetlands and allow water to flow into arid soil. One commonly used method for forming a drainage or irrigation ditch is by means of a soil grader having a single elongated blade moved generally along its length while engaging the surface of the soil. This approach results in the form of a single ridge on one side of the ditch which prevents water on that side of the ditch from flowing into the ditch. Other ditch forming devices are adapted for pulling by a tractor and include a rotating cutter head coupled by suitable drive shaft linkage to the power takeoff (PTO) unit of the tractor. As the power ditcher is pulled by the tractor with its rotating cutter head positioned within the soil, the cutter blades engage and displace the soil upward in forming a ditch. Such power ditchers are complicated, expensive, difficult to maneuver and subject to damage upon impact with a rock. The design of the cutter head is such that upon impact with a rock it is not readily deflected thus generally requiring removal and replacement of one or more of its cutting blades. This takes time and is expensive.

The present invention overcomes the aforementioned limitations of the prior art by providing a ditch forming apparatus which is inexpensive, lightweight and highly maneuverable, includes a minimum number of moving parts, and is adapted for easy mounting and adjustable operation on the aft portion of a traction vehicle.

BACKGROUND AND SUMMARY OF THE INVENTION

Accordingly, it is an object of the present invention to provide an improved ditch forming apparatus.

It is another object of the present invention to provide a ditch forming apparatus which is adapted for drawing by a traction vehicle in forming a ditch by displacing soil evenly on both sides of the ditch.

Yet another object of the present invention is to provide an inexpensive, high speed ditch forming apparatus which allows for easy adjustment of ditch depth and width, improved handling, and includes a minimum number of moving parts.

A further object of the present invention is to provide straight tracking for a lightweight drawn ditch forming apparatus.

Accordingly, this invention contemplates apparatus for forming a ditch comprising a frame adapted for coupling to and displacement by a traction vehicle; and first and second discs rotationally mounted to respective opposed, lateral portions of the frame and oriented at respective angles to the direction of displacement of said frame, wherein forward portions of the discs are arranged in an overlapping manner along the direction of displacement, with each disc including a respective circular peripheral edge and opposed concave and convex sides, wherein the convex sides of the discs are oriented in facing relation and inwardly toward the frame and wherein the second disc is positioned lower than and aft of the first disc as the discs are moved through the soil.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENT

Figure 1:
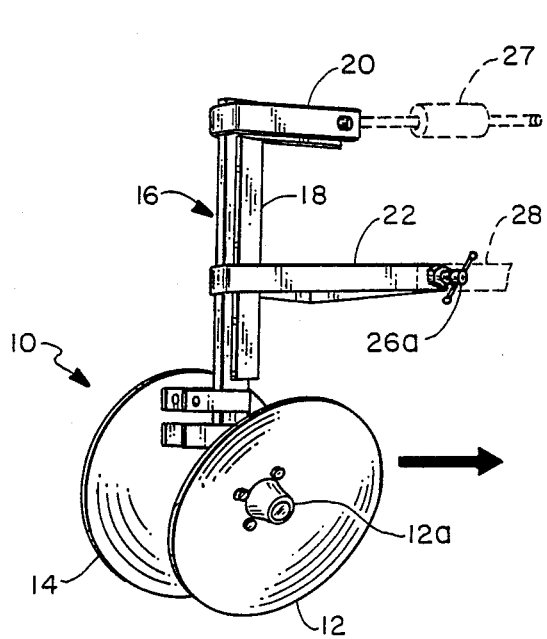
FIG. 1 is a side perspective view of a ditch forming apparatus in accordance with the present invention.
Figure 2:
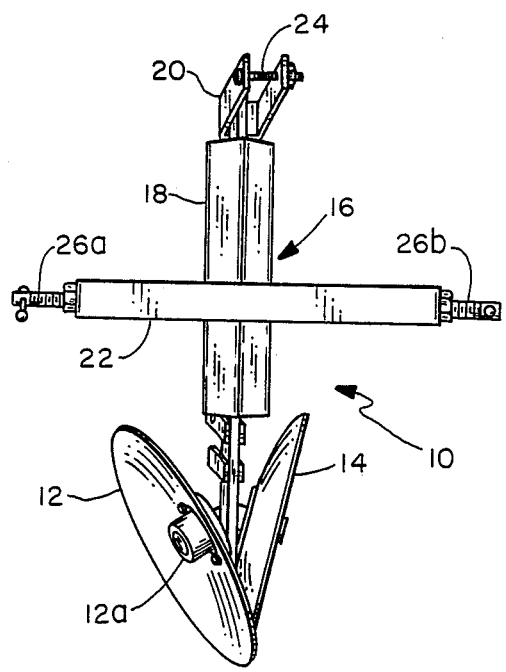
FIG. 2 is a front perspective view of the ditch forming apparatus shown in FIG. 1.
Figure 3:
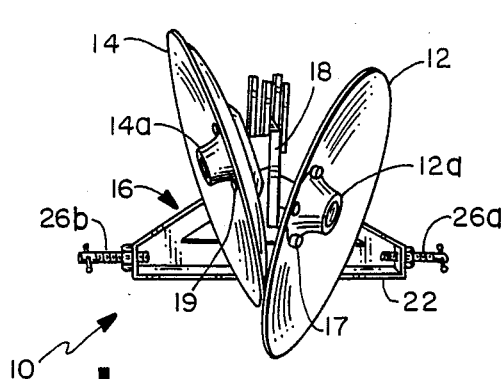
FIG. 3 is a bottom plan view of the ditch forming apparatus shown in FIG. 1.

Referring to FIG. 1, there is shown a side perspective view of a ditch forming apparatus 10 in accordance with the present invention. FIGS. 2 and 3 are front and bottom plan views, respectively, of the ditch forming apparatus 10 of FIG. 1. The ditch forming apparatus 10 is adapted to be drawn in the direction of the arrows shown in FIGS. 1 and 3 as described below.

The ditch forming apparatus 10 includes first and second discs 12 and 14 rotationally mounted to a lower portion of a support/coupling frame 16. Each of the first and second discs 12, 14 includes a concave surface and a convex surface, with the concave surfaces of each of these discs directed outward from the support/coupling frame 16. Each of the discs 12, 14 further includes a sharp, circular peripheral edge for engaging and displacing soil and forming a ditch as described below.

The support/coupling frame 16 includes a generally upright member 18 to which are securely coupled an upper mounting bracket 20 and a lower mounting bracket 22. Each of the mounting brackets 20, 22 is securely coupled to the support/coupling frame 16 by conventional means such as weldments or nut and bolt combinations. The upper mounting bracket 20 is generally U-shaped and has a coupling pin 24 inserted through the distal end thereof. The coupling pin 24 permits the upper mounting bracket 20 to be securely coupled to a hydraulic cylinder 27 (shown in dotted line form in FIG. 1) such as is typically mounted to an aft portion of a traction vehicle, such as an agricultural tractor, which is not shown in the figures for simplicity.

The lower mounting bracket 22 is generally triangular in shape and has a pair of pivot pins 26a, 26b extending from lateral portions thereof. Each of the pivot pins 26a, 26b is adapted for attachment to a support frame of the traction vehicle and, in combination, define a pivot axis about which the ditch forming apparatus 10 is freely pivotable in response to extension and retraction of the hydraulic cylinder 27. Pivoting displacement of the ditch forming apparatus 10 about the axis defined by the pivot pins 26a and 26b allows the ditch forming apparatus to be moved between an upraised, nonuse position and a lowered, soil engaging use position by means of the retraction and extension of the hydraulic cylinder 27. The present invention is not limited to this arrangement for moving it between the use and nonuse positions, as various mounting and displacement arrangements well known to those skilled in the relevant arts could be used for lowering and raising the ditch forming apparatus of the present invention.

Figure 4:
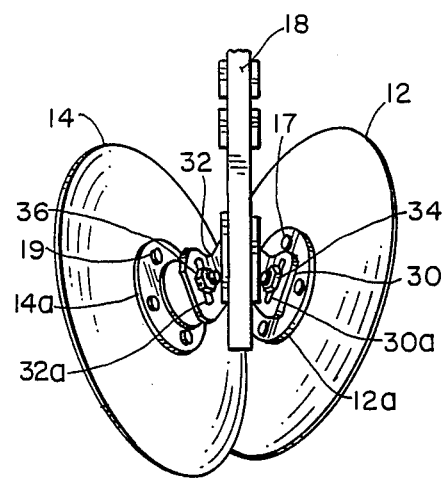
FIG. 4 is an aft plan view of a lower portion of the ditch forming apparatus of FIG. 1 showing details of the mounting arrangement for a pair of discs.
Figure 5:
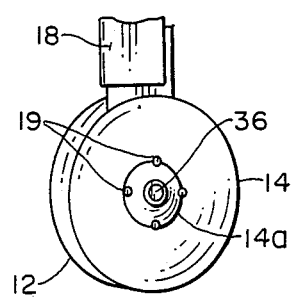
FIG. 5 is a side plan view of the pair of discs used in a lower portion of the ditch forming apparatus of the present invention.

As shown in the above referenced figures and as further illustrated in FIGS. 4 and 5, which are respectively aft and side views of a lower portion of the ditch forming apparatus, each of the first and second discs 12, 14 includes a respective mounting hub 12a and 14a. The arrow in FIG. 5 shows the direction of displacement of the first and second discs 12, 14. Mounting hub 12a is coupled to the upright member 18 of the support/coupling frame by means of a first mounting bracket 30. The first mounting bracket 30 is securely attached to the upright member 18 by conventional means such as a weldment or nut and bolt combination and includes an elongated slot 30a therein. Inserted through the mounting hub 12a as well as through the mounting slot 30a in the first mounting bracket 30 is a nut and bolt combination 34 for securely coupling the mounting hub 12a to the first mounting bracket 30. A plurality of mounting pins 17 are inserted through respective aligned apertures in the first disc 12 and its mounting hub 12a for securely attaching the disc to the mounting hub.

On the other side of the upright member 18 of the support/coupling frame is securely attached a second mounting bracket 32 having a mounting slot 32a therein. The mounting hub 14a is coupled to the second mounting bracket 32 by means of a nut and bolt combination 36. As in the case of the first disc 12, a plurality of spaced mounting pins 19 are inserted through respective aligned apertures in the second disc 14 and its mounting hub 14a for attaching the disc to the mounting hub. Each of the mounting hubs 12a, 14a includes a bearing structure (not shown for simplicity) to permit each of the discs to rotate relative to the mounting brackets and support/coupling frame 16. The mounting slots 30a, 32a within the first and second mounting brackets 30, 32, respectively, allow the relative position of the discs on the support/coupling frame 16 to be adjusted as desired.

As shown in the various figures, the first disc 12 is positioned slightly forward of and higher than the second disc 14. In a preferred embodiment, the second disc 14 is approximately one inch lower than and one inch aft of the first disc 12. The depth and forward/aft positions of each of the discs 12, 14 may be independently adjusted by selective positioning of the nut and bolt combinations 34 and 36 within the respective mounting slots 30a, 32a of the first and second mounting brackets 30, 32. Also as shown in the various figures, the leading edges of the discs 12, 14 are arranged in an overlapping manner along the direction of ditcher displacement. By positioning the trailing second disc 14 lower, or deeper in the soil, than the first disc 12 the ditch forming apparatus 10 will track in a straight line when pulled because the first disc does not extend as deep into the soil as the second disc. By thus compensating for the greater drag imposed on the leading first disc 12 by positioning the trailing second disc 14 deeper in the soil, linear tracking of the ditch forming apparatus through the soil is provided.

Also as shown in the various figures, the increased drag on the leading first disc 12 may be compensated for by orienting the trailing second disc 14 at a greater relative angle to the direction of displacement of the ditch forming apparatus 10. Thus, linear tracking of the ditch forming apparatus 10 through the soil may also be provided by making the relative angle of the trailing second disc 14 to the direction of travel of the apparatus greater than that of the leading first disc 12.

There has thus been shown a ditch forming apparatus comprised of first and second opposed discs mounted to a support frame adapted to be drawn by a traction vehicle. The two discs are positioned in an overlapping, angled orientation relative to the direction of travel to form a V-shaped trench, the depth and width of which may be selected by adjusting the relative position of the discs on the support frame. With one disc positioned lower than the other, linear tracking compensation is provided by orienting the higher disc at a greater relative angle to the direction of travel.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. Apparatus for forming a ditch comprising:
   a frame adapted for coupling to and displacement by a traction vehicle, said frame including a generally upright member and a three-point hitch for coupling to said traction vehicle; and
   first and second discs rotationally mounted to respective opposed, lateral portions of said generally upright member and oriented at respective angles to the direction of displacement of said frame, wherein forward portions of said discs are arranged in an overlapping manner along the direction of displacement, with each disc including a respective circular peripheral edge and opposed concave and convex sides, wherein the convex sides of said discs are oriented in facing relation and inwardly toward said frame and wherein said second disc is positioned lower than and aft of said first disc and said second disc is oriented outward at a greater angle relative to the direction of displacement of the frame than said first disc to compensate for the increased drag on said first disc to allow for straight tracking of the apparatus as said discs are moved through the soil.

2. The apparatus of claim 1 further comprising adjustment means for changing the relative positions of said first and second discs.

3. The apparatus of claim 2 wherein said adjustment means includes first and second mounting brackets each including a respective slot through which a mounting pin is inserted for coupling said first and second discs respectively thereto.

4. The apparatus of claim 3 wherein each of said slots is oriented at an angle relative to the direction of displacement of said frame to allow the depth and forward/aft position of each of said discs to be adjusted independently.

5. The apparatus of claim 4 wherein said slots are oriented inwardly toward said frame to allow the extent of overlap of said discs along the direction of displacement to be selectively adjusted.

6. The apparatus of claim 5 wherein said frame includes upper and lower mounting brackets coupled to said traction vehicle in a linearly displaceable and a pivoting manner, respectively, to allow said discs to either engage or be withdrawn from the soil.

7. The apparatus of claim 6 further comprising a hydraulic cylinder coupling said upper mounting bracket to said traction vehicle.

8. The apparatus of claim 7 further comprising at least one pivot pin coupling said lower mounting bracket to said traction vehicle.

9. The apparatus of claim 1 wherein said second disc is approximately one inch lower than and one inch aft of said first disc.

10. The apparatus of claim 1 wherein said frame includes first and second mounting brackets and said first and second discs respectively include first and second mounting hubs respectively coupled to said first and second mounting brackets.

11. The apparatus of claim 1 further comprising means for changing the spacing between said first and second discs in allowing for the forming of ditches having a range of widths.

12. Apparatus for forming a ditch comprising:
a frame adapted for coupling to and being drawn by a traction vehicle, said frame including a generally upright member and a three-point hitch for coupling to said traction vehicle;
a first rotating disc mounted to said generally upright member at a first angle relative to the direction said frame is drawn by the traction vehicle and including a first circular peripheral edge and first concave and convex sides, wherein said first convex side is oriented toward said generally upright member; and
a second rotating disc mounted to said generally upright member aft of said first disc and at a second angle relative to the direction said frame is drawn by the traction vehicle, said second disc including a second circular peripheral edge and second concave and convex sides, wherein said second convex side is oriented toward said generally upright member, and wherein forward portions of said discs are arranged in an overlapping manner along the direction said frame is drawn by the traction vehicle, and wherein said second angle is greater than said first angle and said second disc is positioned lower than said first disc on said generally upright member to compensate for the increased drag on said first disc to allow for straight tracking of the apparatus.

13. The apparatus of claim 12 further comprising adjustment means for changing the relative positions of said first and second discs.

14. The apparatus of claim 13 wherein said adjustment means includes first and second mounting brackets each including a respective slot through which a mounting pin is inserted for coupling said first and second discs respectively thereto.

15. The apparatus of claim 14 wherein each of said slots is oriented at an angle relative to the direction of displacement of said frame to allow the depth and forward/aft position of each of said discs to be adjusted independently.

16. The apparatus of claim 15 wherein said slots are oriented inwardly toward said frame to allow the extent of overlap of said discs along the direction of displacement to be selectively adjusted.

17. The apparatus of claim 16 wherein said frame includes upper and lower mounting brackets coupled to said traction vehicle in a linearly displaceable and a pivoting manner, respectively, to allow said discs to either engage or be withdrawn from the soil.

18. The apparatus of claim 17 further comprising a hydraulic cylinder coupling said upper mounting bracket to said traction vehicle.

19. The apparatus of claim 18 further comprising at least one pivot pin coupling said lower mounting bracket to said traction vehicle.

20. The apparatus of claim 12 wherein said second disc is approximately one inch lower than and one inch aft of said first disc.

21. The apparatus of claim 12 wherein said frame includes first and second mounting brackets and said first and second discs respectively include first and second mounting hubs respectively coupled to said first and second mounting brackets.

22. The apparatus of claim 12 further comprising means for changing the spacing between said first and second discs in allowing for the forming of ditches having a range of widths.

* * * * *